(12) United States Patent
Bharti et al.

(10) Patent No.: US 11,521,338 B2
(45) Date of Patent: Dec. 6, 2022

(54) COMPUTER AUTOMATED GENERATION OF WORK-FLOW DIAGRAM FROM TECHNOLOGY SPECIFIC LITERATURE

(71) Applicant: International Business Machines Corporation, Armonk, NY (US)

(72) Inventors: Harish Bharti, Pune (IN); Pinaki Bhattacharya, Pune (IN); Rajeev Mittal, Gurgaon (IN); Rajesh Kumar Saxena, Maharashtra (IN); Sandeep Sukhija, Rajasthan (IN); Dinesh Wadekar, Pune (IN)

(73) Assignee: International Business Machines Corporation, Armonk, NY (US)

(*) Notice: Subject to any disclaimer, the term of this patent is extended or adjusted under 35 U.S.C. 154(b) by 67 days.

(21) Appl. No.: 17/113,105

(22) Filed: Dec. 7, 2020

(65) Prior Publication Data
US 2022/0180579 A1    Jun. 9, 2022

(51) Int. Cl.
*G06T 11/20* (2006.01)
*G06F 40/30* (2020.01)
*G06F 16/901* (2019.01)

(52) U.S. Cl.
CPC ........ *G06T 11/206* (2013.01); *G06F 16/9024* (2019.01); *G06F 40/30* (2020.01)

(58) Field of Classification Search
CPC ..... G06T 11/206; G06F 16/9024; G06F 40/30
See application file for complete search history.

(56) References Cited

U.S. PATENT DOCUMENTS

| 9,824,232 | B1* | 11/2017 | Carmack | G06F 21/16 |
| 2007/0055491 | A1* | 3/2007 | Manson | G06F 40/30 |
| | | | | 704/9 |
| 2013/0013287 | A1* | 1/2013 | Takayama | G06F 8/34 |
| | | | | 704/4 |
| 2019/0114304 | A1* | 4/2019 | Oliveira | G06F 16/958 |
| 2021/0027006 | A1* | 1/2021 | Humphrey | G06F 30/30 |

OTHER PUBLICATIONS

S. Gulia and T. Choudhury, "An efficient automated design to generate UML diagram from Natural Language Specifications," 2016 6th International Conference—Cloud System and Big Data Engineering (Confluence), 2016, pp. 641-648, doi: 10.1109/CONFLUENCE.2016.7508197. (Year: 2016).*

(Continued)

*Primary Examiner* — Phi Hoang
(74) *Attorney, Agent, or Firm* — Michael A. Petrocelli

(57) ABSTRACT

Generating a work-flow diagram from technology specific literature includes using an analysis of technology specific literature which includes using natural language processing (NLP), to derive semantics for a plurality of components defined in the technology specific literature. The plurality of components are associated to symbols in a component symbol database. The associated symbols are assigned to each of the plurality of components, respectively. A relationship is determined for each of the plurality of components. Nodes are assigned, and vectors are assigned when applicable, for each of the symbols. A work-flow diagram is generated for the technology specific literature using the assigned associated symbols for each of the plurality of components and the nodes and the vectors for each of the symbols.

20 Claims, 14 Drawing Sheets

(56) References Cited

OTHER PUBLICATIONS

M. Ibrahim and R. Ahmad, "Class Diagram Extraction from Textual Requirements Using Natural Language Processing (NLP) Techniques," 2010 Second International Conference on Computer Research and Development, 2010, pp. 200-204, doi: 10.1109/ICCRD.2010.71. (Year: 2010).*

Bajwa, Imran Sarwar, and M. Abbas Choudhary. "Natural language processing based automated system for uml diagrams generation." The 18th Saudi National Computer Conf. on computer science (NCC18). Riyadh, Saudi Arabia: The Saudi Computer Society (SCS). 2006. (Year: 2006).*

"A Method for extracting Entity-Action Relationships and other related Attributes from Technical Documents", An IP.com Prior Art Database Technical Disclosure, Disclosed Anonymously, IP.com No. IPCOM000261134D, IP.com Electronic Publication Date: Feb. 2, 2020, 6 pages.

Alksasbeh, et al., "An Automated Use Case Diagrams Generator From Natural Language Requirements", Journal of Theoretical and Applied Information Technology, Mar. 15, 2017. vol. 95. No. 5, pp. 1182-1190, <www.jatit.org/volumes/Vol95No5/21Vol95No5.pdf>.

Bajwa, et al., "UCD-Generator—A LESSA Application for Use Case Design", IEEE—2007 International Conference on Information and Emerging Technologies, 6 pages, <https://ieeexplore.ieee.org/document/4381333?arnumber=4381333>.

Deeptimahanti, et al., "An Automated Tool for Generating UML Models from Natural Language Requirements", 2009 IEEE/ACM International Conference on Automated Software Engineering, pp. 680-682, <https://ieeexplore.ieee.org/document/5431706>.

Mell et al., "The NIST Definition of Cloud Computing", National Institute of Standards and Technology, Special Publication 800-145, Sep. 2011, 7 pages.

Mukerjee, et al., "Evaluation of Automatic Conversion of Text to Diagram", International Journal of Emerging Technology and Advanced Engineering, vol. 2, Issue 5, May 2012, pp. 410-419, <https://ijetae.com/files/Volume2Issue5/IJETAE_0512_70.pdf>.

Mukherjee, et al., "Automatic Diagram Drawing Based on Natural Language Text Understanding", Diagrams 2008: Diagrammatic Representation and Inference, Abstract Only, pp. 398-400, <https://link.springer.com/chapter/10.1007/978-3-540-87730-1_47>.

Sharma, et al., "Automated Generation of Activity and Sequence Diagrams from Natural Language Requirements", Proceedings of the 9th International Conference on Evaluation of Novel Approaches to Software Engineering (ENASE-2014), pp. 69-77, <https://ieeexplore.ieee.org/document/7077118>.

* cited by examiner

3000

3002　TABLE 1: COMPONENT SYMBOLS
　　　　　3004

| Component Category | Component Name | Component description | Types | Icon | Image |
|---|---|---|---|---|---|
| Power Supply | Transformer | Used to change AC voltage from high to low or | Step Up Transformer | | |
| | | | Step Down Transformer | | |
| | | | Pole Mounted Tranformer | | |
| Power Supply | Transmission Tower | Used to support an overhead power line | | | |
| Power Supply | Substation | Electrical substations are the interface between parts of the distribution systems and transmission systems. | | | |

FIG. 15

COMPUTER AUTOMATED GENERATION OF WORK-FLOW DIAGRAM FROM TECHNOLOGY SPECIFIC LITERATURE

BACKGROUND

The present disclosure relates to techniques for automatically generating work-flow diagrams from technology specific literature using a computer.

In some industries, it can be challenging for a representative of a company to understand an end user, when the end user is contacting a company representative with a problem or issue. For example, in the Energy and Utility industry (E&U Industry), when an end user calls customer server for a utility company, the end user may not be able to provide details about conditions or equipment as a layman which can be useful for assessing an issue. Such a situation can become critical during an emergency. Again, referring to the utility industry, for example, an emergency such as a storm, flooding, or mass outage, etc., when a utility company cannot relate which asset a user might be referring to.

It would therefore be useful to streamline and assist in assessing a received problem or issue, for example, as with an end user of a utility product.

SUMMARY

The present disclosure recognizes the shortcomings and problems associated with acoustic analysis of machine vibration for provide a machine maintenance action.

The present disclosure includes a method and system by which a user's description can be converted into a pictorial view for technical personnel such as engineers can quickly interpret several details and save time during a critical situation. Similarly, in another example, a utility field worker can get instructions to execute a work order in textual form, and it would be advantageous to convert a text work instruction to a pictorial view to assist in understanding the work order.

The present invention can include a method or framework/system which can convert a technology domain related work order in text form into a graphical representation using domain tokens mapped with common information for the technology domain as a common information model. For example, a method and system can include converting an energy & utility domain related work-order's textual instruction into graphical representation using electrical domain tokens mapped with E&U common information model (CIM). The present invention includes curating verb vocabulary for each organization's specific dictionary, for example, an electrical domain token dictionary.

In an aspect according to the present invention, a computer-implemented method for generating a work-flow diagram from technology specific literature includes determining, using a computer, using an analysis of technology specific literature which includes using natural language processing (NLP), semantics for a plurality of components defined in the technology specific literature. The method includes associating, using the computer, the plurality of components to symbols in a component symbol database. Further, the method includes assigning the associated symbols to each of the plurality of components, respectively, and determining a relationship for each of the plurality of components. The method includes assigning nodes, and assigning vectors when applicable, for each of the symbols, and generating a work-flow diagram for the technology specific literature using the assigned associated symbols for each of the plurality of components and the nodes and the vectors for each of the symbols.

In a related aspect, the technology specific literature can be received at the computer.

In a related aspect, the technology specific literature is, at least in part, energy and utility industry specific literature.

In a related aspect, the method further includes identifying each of the plurality of components which are closest to an industry model for a technology.

In a related aspect, the method can further include identifying each of the plurality of components which are closest to entities, respectively, of an industry model for a technology; and resolving ambiguity regarding closeness of one of the plurality of components to an entity of the industry model by using a graph-based domain model.

In a related aspect, the method can further include identifying each of the plurality of components which are closest to entities, respectively, of an industry model for a technology, resolving ambiguity regarding closeness of one of the plurality of components to an entity of the industry model by using a graph-based domain model, and the graph-based model includes representing the entities as nodes and connections of the nodes to each other as vertices of actions being performed on the entities.

In a related aspect the method can further include identifying directions of connections by mining text of the technology specific literature.

In a related aspect the graph-based model can also analyze a domain model for an industry of the technology specific literature, the domain model including possible symbol combinations and valid connections.

In a related aspect, the assigning of the associated symbols can include using subject matter expert (SME) rules.

In a related aspect, the method can further include joining graphs generated from different sections of text of the technology specific literature, as part of the generating of the work-flow diagram, and the joining of the graphs including iterative traversal of text to apply deduplication of nodes when a same node is referred to in different sections of the text.

In a related aspect, the method can include chromatic modeling to color graphs with identified qualities and intensity of qualities, as part of the generating of the work-flow diagram.

In a related aspect, the method can include receiving, at the computer, the technology specific literature; and analyzing the technology specific literature using the natural language processing.

In another aspect according to the present invention, a system using a computer for generating a work-flow diagram from technology specific literature, comprises: a computer system. The computer system comprises; a computer processor, a computer-readable storage medium, and program instructions stored on the computer-readable storage medium being executable by the processor, to cause the computer system to perform the following functions to; determine, using a computer, using an analysis of technology specific literature which includes using natural language processing (NLP), semantics for a plurality of components defined in the technology specific literature; associate, using the computer, the plurality of components to symbols in a component symbol database; assign the associated symbols to each of the plurality of components, respectively; determine a relationship for each of the plurality of components; assign nodes, and assigning vectors when applicable, for each of the symbols; and generate a work-flow diagram for the technology specific literature using the assigned associated symbols for each of the plurality of components and the nodes and the vectors for each of the symbols.

In a related aspect, the technology specific literature can be received at the computer.

In a related aspect, the technology specific literature is, at least in part, energy and utility industry specific literature.

In a related aspect the system further includes identifying each of the plurality of components which are closest to an industry model for a technology.

In a related aspect, the system further includes identifying each of the plurality of components which are closest to entities, respectively, of an industry model for a technology; and resolving ambiguity regarding closeness of one of the plurality of components to an entity of the industry model by using a graph-based domain model.

In a related aspect, the system can further include identifying each of the plurality of components which are closest to entities, respectively, of an industry model for a technology; resolving ambiguity regarding closeness of one of the plurality of components to an entity of the industry model by using a graph-based domain model; and the graph-based model includes representing the entities as nodes and connections of the nodes to each other as vertices of actions being performed on the entities.

In a related aspect, the system can further include identifying directions of connections by mining text of the technology specific literature.

In another aspect according to the present invention, a computer program product for generating a work-flow diagram from technology specific literature, comprises a computer readable storage medium having program instructions embodied therewith. The program instructions are executable by a computer to cause the computer to perform functions, by the computer, comprising the functions to: determine, using a computer, using an analysis of technology specific literature which includes using natural language processing (NLP), semantics for a plurality of components defined in the technology specific literature; associate, using the computer, the plurality of components to symbols in a component symbol database; assign the associated symbols to each of the plurality of components, respectively; determine a relationship for each of the plurality of components; assign nodes, and assigning vectors when applicable, for each of the symbols; and generate a work-flow diagram for the technology specific literature using the assigned associated symbols for each of the plurality of components and the nodes and the vectors for each of the symbols.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 15 is a table having rows, and columns depicting components, names, descriptions, types, icons and images.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is understood that that embodiments of the present disclosure can be implemented to a specific technical area of an industry. One such area and industry is energy and utilities. The mechanisms and techniques of the embodiments of the present disclosure can also be applied, for example, to a learning environment generating a model for teaching purposes, or pertain to vehicle repairs in the automotive industry, or for appliance repairs in the appliance industry, etc.

EMBODIMENTS AND EXAMPLES

Figure 1:
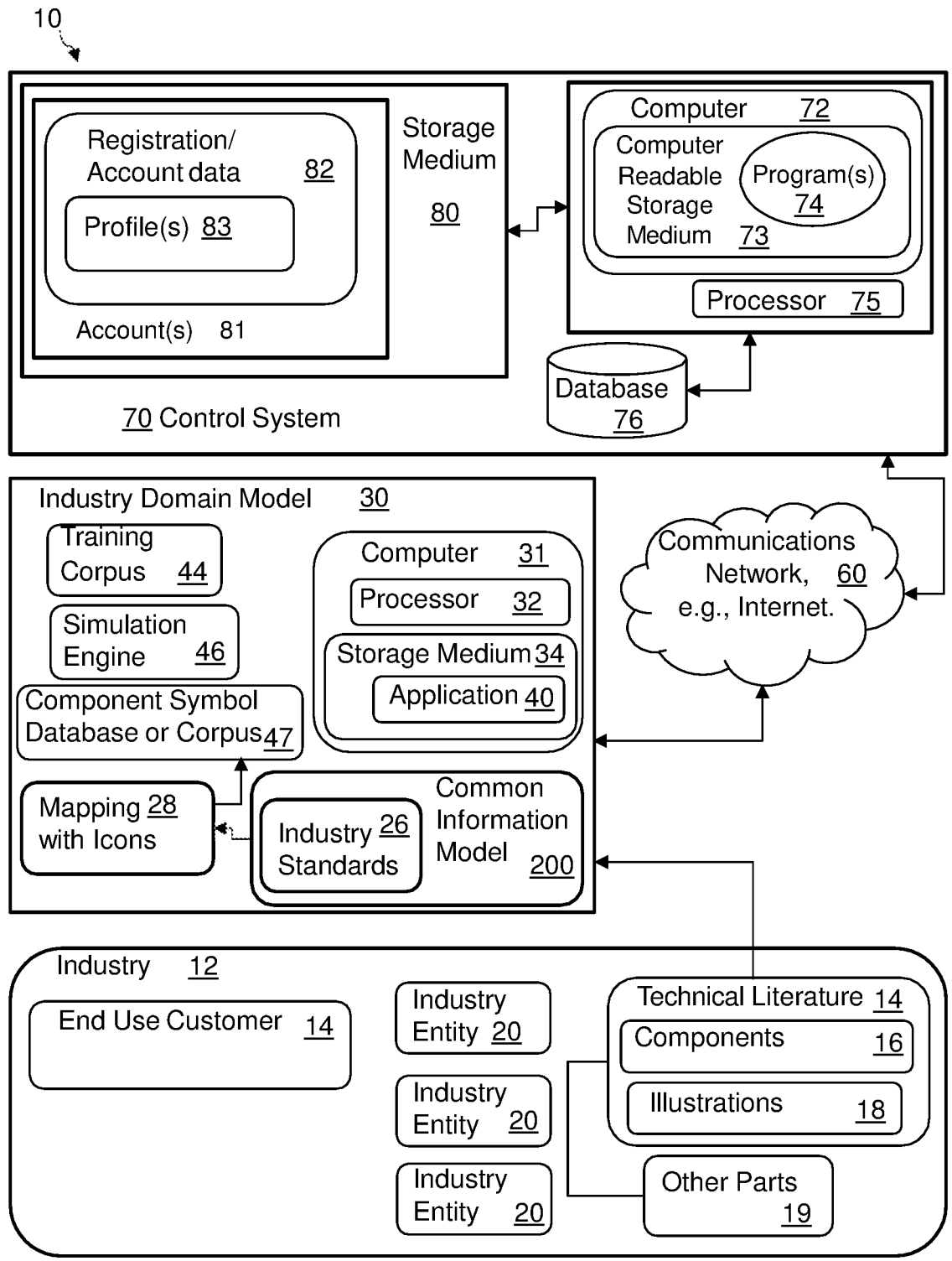
FIG. 1 is a schematic block diagram illustrating an overview of a system, system features or components, and methodology for generating a work-flow diagram from technology specific literature, according to an embodiment of the present disclosure.
Figure 2:
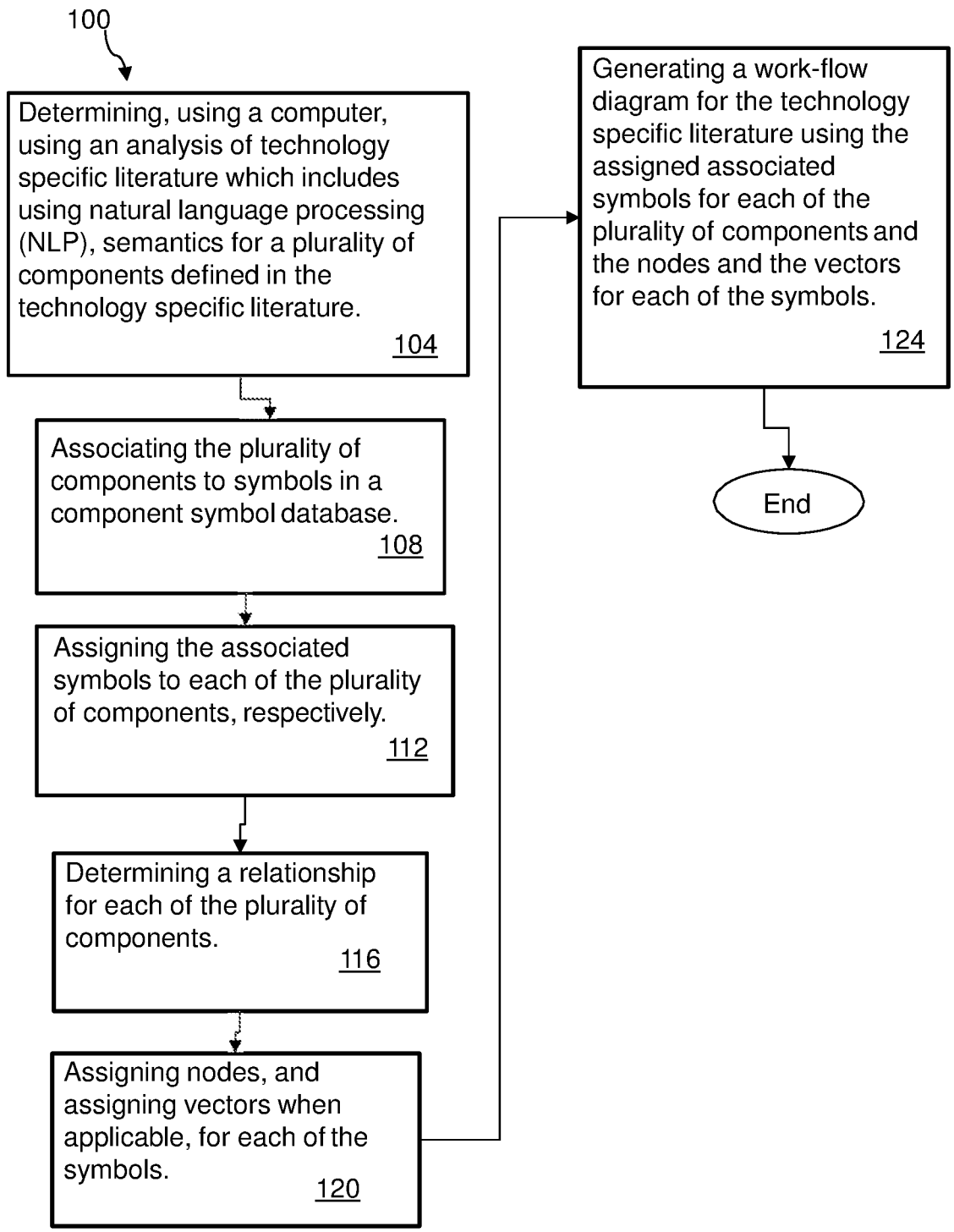
FIG. 2 is a flow chart illustrating a method, implemented using the system shown in FIG. 1, for generating a work-flow diagram from technology specific literature, according to an embodiment of the present disclosure.
Figure 4:
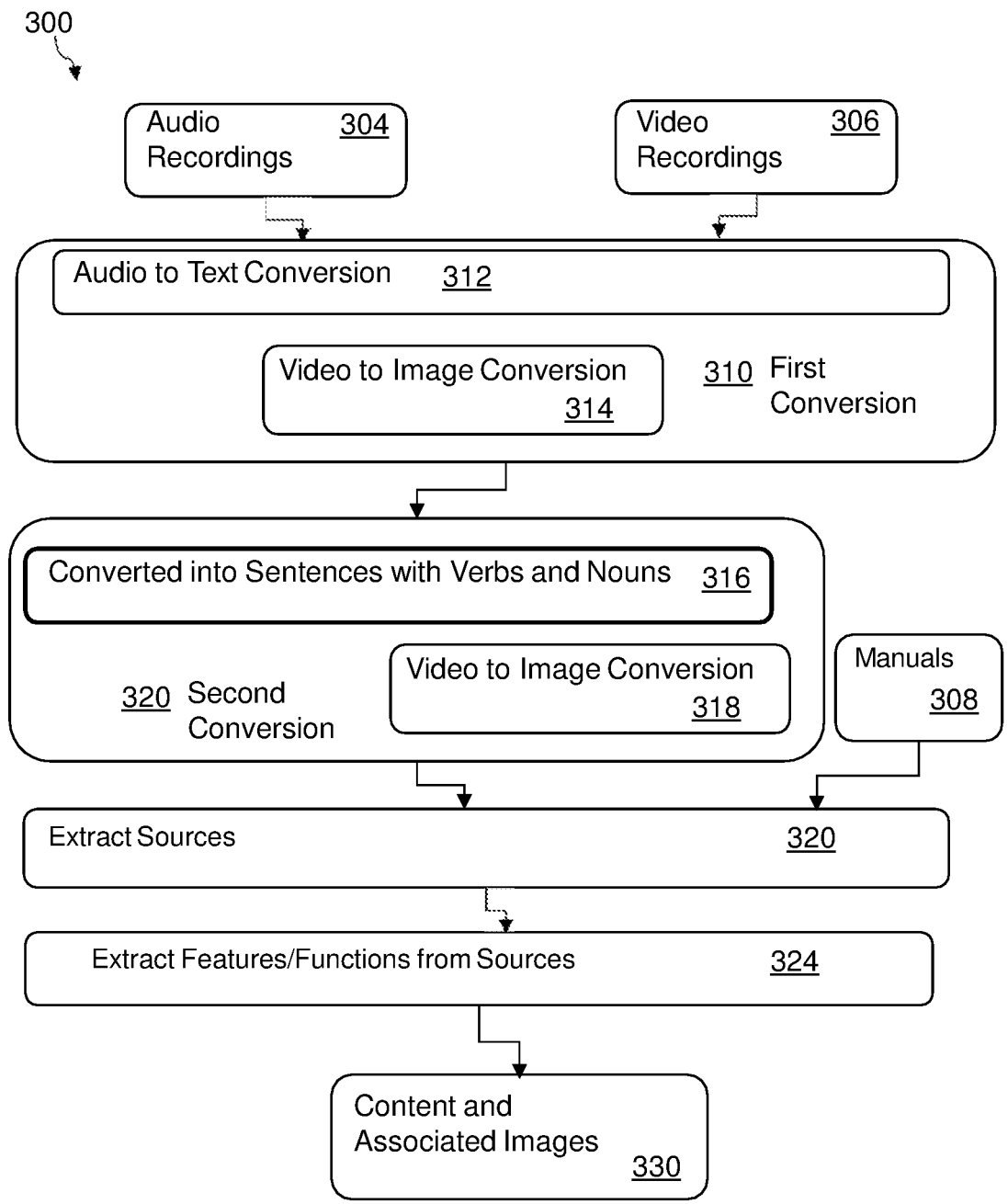
FIG. 4 is a functional schematic block diagram showing a series of operations and functional methodologies in response to receiving audio and video recordings, for instructional purposes illustrating functional features of the present disclosure associated with the embodiments shown in the FIGS., for generating a work-flow diagram from technology specific literature.

Referring to FIGS. 1 and 2, and FIG. 4 a computer-implemented method 100 for generating a work-flow diagram from technology specific literature, according to an embodiment of the present disclosure. The method 100 includes a series of operational blocks for implementing an embodiment according to the present disclosure. The method includes determining, using a computer 31, using an analysis of technology specific literature 14 which includes using natural language processing (NLP), to derive semantics for a plurality of components 16 defined in the technology specific literature 14, as in block 104. The literature can be a written work, published publicly, or accessible by the computer by granting access or otherwise accessible. Moreover, it is understood that the literature can refer to a body of work or a body of literature as well as a single work.

Figure 11:
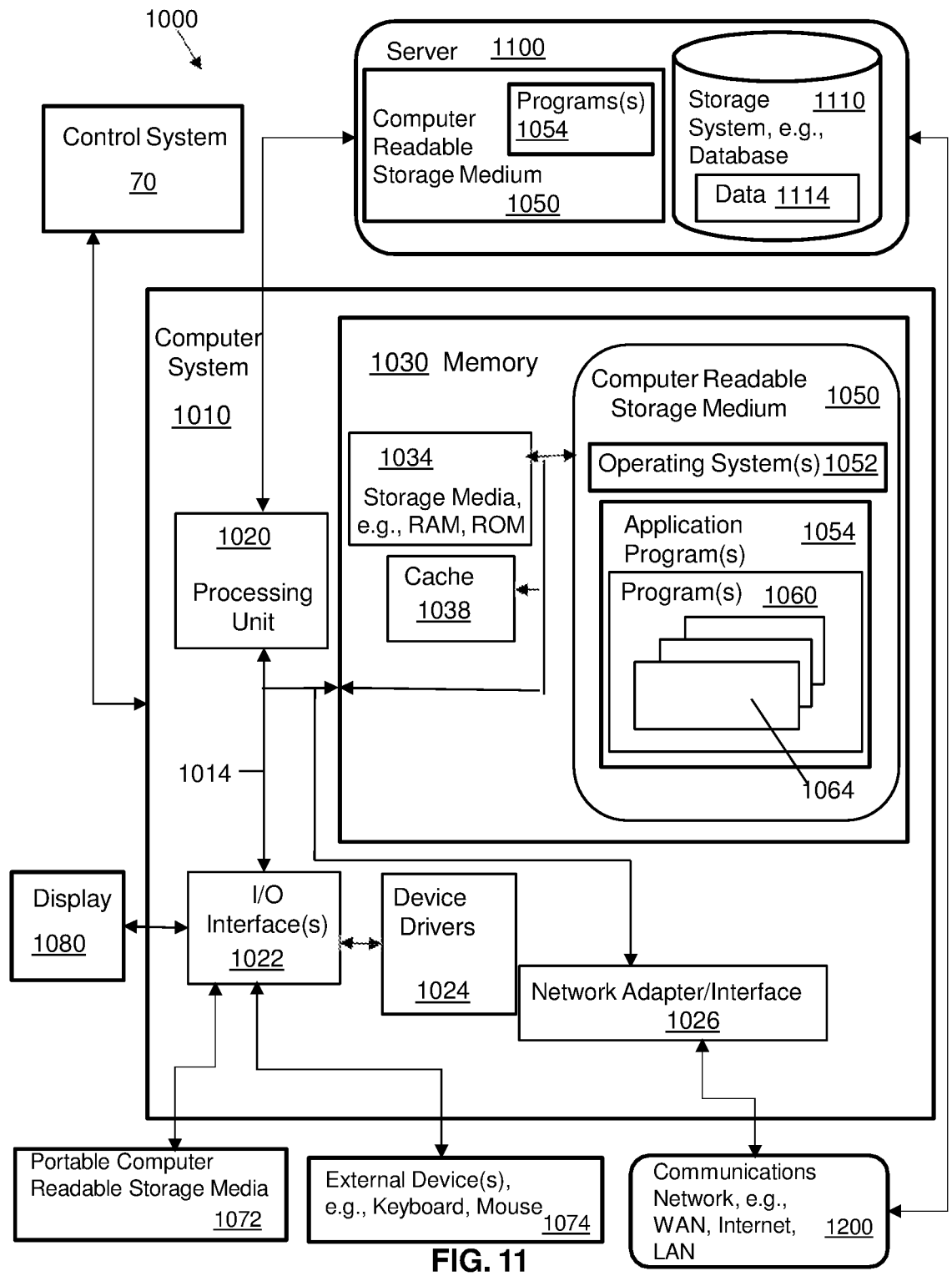
FIG. 11 is a schematic block diagram depicting a computer system according to an embodiment of the disclosure which may be incorporated, all or in part, in one or more computers or devices shown in FIG. 1, and cooperates with the systems and methods shown in the FIGS.
Figure 12:
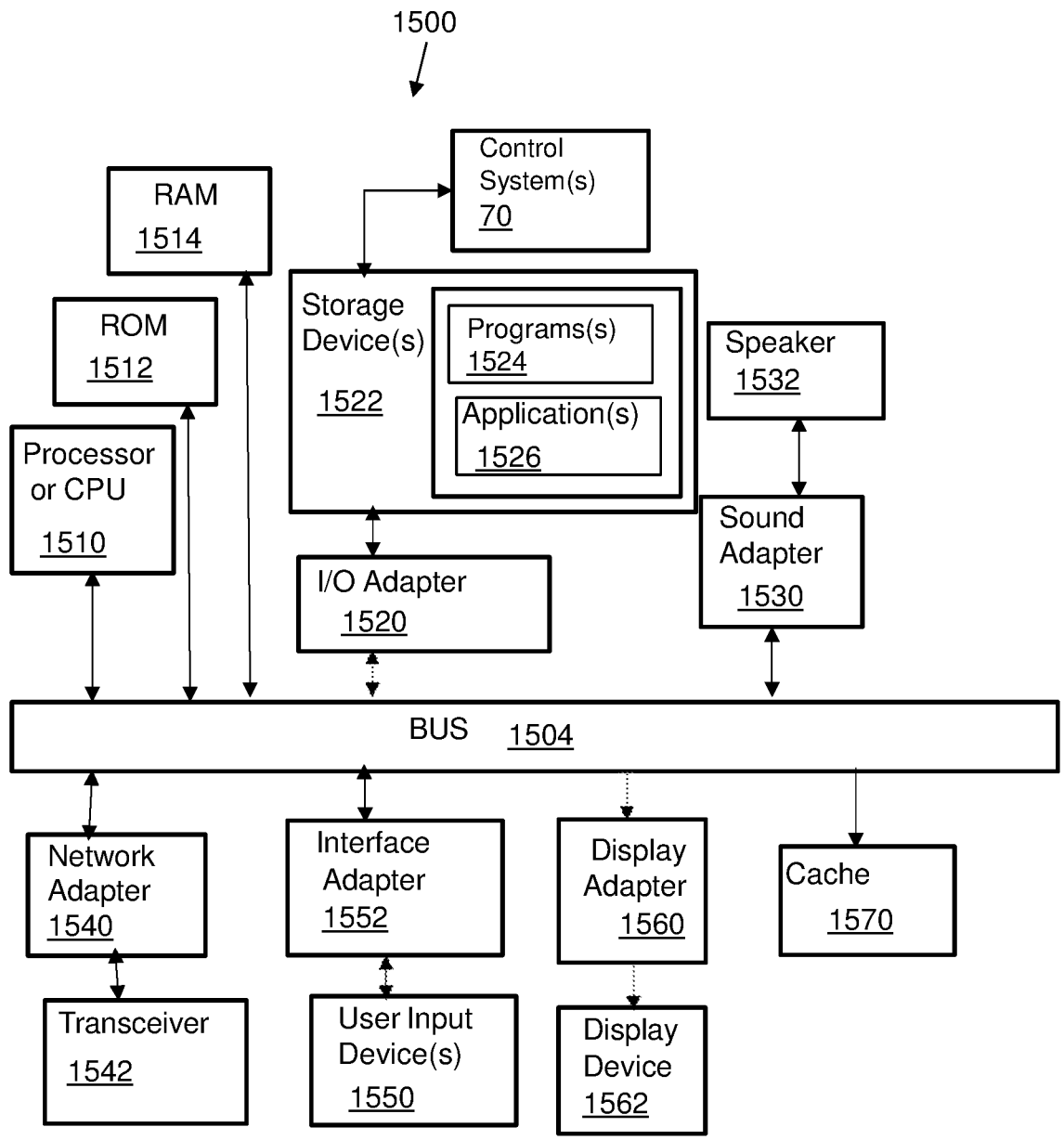
FIG. 12 is a schematic block diagram of a system depicting system components interconnected using a bus. The components for use, in all or in part, with the embodiments of the present disclosure, in accordance with one or more embodiments of the present disclosure.

For example, the computer 31 can receive the technology specific literature 14 and store such in a database or historical database, such a database is generically shown in FIG. 11 as database 1110, and also shown as part of a control system 70 as database 76 which may be accessed by the computer 31. The computer 31 is communicating with or part of an industry domain model 30 which has access to industry technical literature 14. The method can include analyzing the technology specific literature using the natural language processing as above.

Referring to FIG. 1, an example of an industry include an industry 12, which can include the energy and utility industry, and can include an end use customer, such as a consumer, for example a commercial or home consumer of electricity provided by an electrical utility company. The industry includes entities 20, or components, to provide a product, for example, in the electrical utility industry, substations, transmission lines, transformers, and connections. Technical literature 14 can reference to components 16 and illustrations 18, and reference to other parts 19.

An industry domain model 30 can be used to leverage an industry model for extracting semantics for components 16 used in the industry 12. The industry domain model can include a computer 31 which can include a processor 32, a storage medium 34 and an application stored on the storage medium 34. The industry domain model can further include a training corpus 44, a simulation engine 46, a component symbol database or corpus 47. The industry domain model can also include a mapping with icons 28, and a common information model 200 with industry standards 26. The industry domain model 30 communicates with a control system 70 via a communications network 60 for example, using the Internet.

The method 100 includes associating the plurality of components 16 to symbols 47 in a component symbol database, as in block 108. For example, the method and system can use the technical literature to compare to a common information model 200 which contains industry standards 26.

The method includes assigning the associated symbols to each of the plurality of components, respectively, as in block 112. For example, the industry domain model can include mapping with icons 28 to populate the component symbol database 47 by mapping components using the common information model and industry standards to associate icons with components.

The method includes determining a relationship for each of the plurality of components, as in block 116, and assigning nodes, and assigning vectors when applicable, for each of the symbols, as in block 120. For example, the industry domain model can use the mapping with icons feature 28 and the component symbol database to assign nodes, and vectors when applicable. Each of the nodes represents an entity and the entity's connection by a line or a vector.

The method includes generating a work-flow diagram for the technology specific literature using the assigned associated symbols for each of the plurality of components and the nodes and the vectors for each of the symbols, as in block 124.

OTHER EXAMPLES AND EMBODIMENTS

The method 100 can include the technology specific literature as received at the computer, for instance, to populate a database for such literature, whether textual or video. In another example, the technology specific literature can be, at least in part, energy and utility industry specific literature.

The method 100 can also include identifying each of the plurality of components which are closest to an industry model for a technology, for example, an E&U entity.

In a further example, the method can include identifying each of the plurality of components which are closest to entities, respectively, of an industry model for a technology, and the method can include resolving ambiguity regarding closeness of one of the plurality of components to an entity of the industry model by using a graph-based domain model.

In another example, the method can include identifying each of the plurality of components which are closest to entities, respectively, of an industry model for a technology; and resolving ambiguity regarding closeness of one of the plurality of components to an entity of the industry model by using a graph-based domain model. In this example, the method can also include the graph-based model representing the entities as nodes and connections of the nodes to each other as vertices of actions being performed on the entities.

The method can further include identifying directions of connection by identifying direction of connections by mining text of the technology specific literature.

Further, the method can include the graph-based model analyzing a domain model for an industry of the technology specific literature, and the domain model including possible symbol combinations and valid connections.

The method can include the assigning of the associated symbols using subject matter expert (SME) rules. For example, the method and system can receive or access a database of SME rules. The SME rules can be populated by receiving at the system the SME rules. The SME rules can include data regarding components and interconnections of the components.

In another example, the method can include joining graphs generated from different sections of text of the technology specific literature, as part of the generating of the work-flow diagram. The joining of the graphs can include iterative traversal of text to apply deduplication of nodes when a same node is referred to in different sections of the text.

In another example, the method can include chromatic modeling to color graphs with identified qualities and intensity of qualities, as part of the generating of the work-flow diagram.

In another example, the method can include receiving, at the computer, the technology specific literature, and analyzing the technology specific literature using the natural language processing.

OTHER EMBODIMENTS AND EXAMPLES

In one example, the system of the present disclosure can include a control system 70 communicating with the cognitive system 30 via a communications network 60. The control system can incorporate all or part of an application or software for implementing the method of the present disclosure. The control system can include a computer readable storage medium 80 where account data and/or registration data 82 can be stored. User profiles 83 can be part of the account data and stored on the storage medium 80. The control system can include a computer 72 having computer readable storage medium 73 and software programs 74 stored therein. A process or 75 can be used to execute or implement the instructions of the software program. The control system can also include a database 76.

In examples, a user can include an end user or customer, however, a user can also include a company, a representative of a company, or other entity using an embodiment of the method and system of the present disclosure, all of which are collectively referred to as a user. For instance, in another example, a user can be a utility company, or representatives of the company, for instance, help desk personnel, using a method and system of the present disclosure to receive, assess, and remedy a problem or complaint, such as an outage of power for a utility company.

A user can register or create an account using the control system 70 which can include one or more profiles 83 as part of registration and/or account data 82. The registration can include profiles for each user having personalized data. For example, users can register using a website via their computer and GUI (Graphical User Interface) interface. The registration or account data 82 can include profiles 83 for an account 81 for each user. Such accounts can be stored on the control system 70, which can also use the database 76 for data storage.

Additionally, the method and system is discussed with reference to FIGS. 4 and 5, which are functional systems which includes components and operations for embodiments according to the present disclosure, and are used herein for reference when describing the methods and systems of the present disclosure. Additionally, the functional systems, according to embodiments of the present disclosure, depict functional operation indicative of the embodiments discussed herein.

OTHER EMBODIMENTS AND EXAMPLES

At a high level, an embodiment according to the present disclosure, directed to the energy and utility industry, as one example, can include a system for curating associated electrical domain token dictionary associated with each function of specific organization, which links electrical domain terms to E&U Industry standards for easy linkage to symbols for each entity. The system can include processing energy and utility specific literature and understanding context of the literature using electrical domain token capabilities. The system can include creating work-flow diagrams of work-order's instruction using associated verbs for the specific function with matching electrical domain tokens. The system can use a combination of deep learning and supervised learning algorithms to achieve the above-mentioned task of understanding context and creating work-flow diagrams. For example, the system can extract component symbols and information about their relationship.

Embodiments according to the present disclosure can include a framework embodied as a method and system to automatically draw work-flow diagrams from industry specific literature, for example, from energy and utility (E&U) industry specific literature.

A method includes leveraging industry model to extract a specific industry semantics, for example, energy & utility (E&U) semantics, for which has definition of each and every electrical component and relationship with other components.

The method includes establishing an association of the components with a component symbol database so that the symbols can be used to represent the components.

The method includes identifying the components which are closest to an industry entity model, for example, an E&U entity of an industry model. Ambiguities can be solved by a graph-based domain model.

Figure 8:
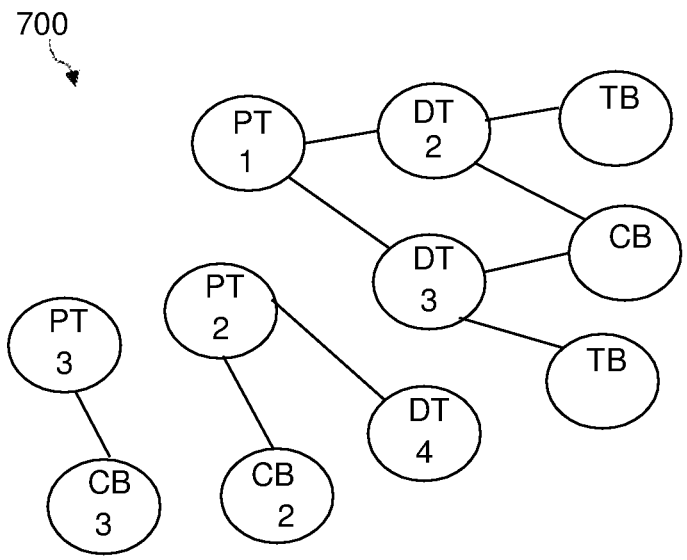
FIG. 8 is another functional schematic block diagram showing nodes for instructional purposes illustrating functional features of the present disclosure associated with the embodiments shown in the FIGS., for generating a work-flow diagram from technology specific literature.
Figure 9:
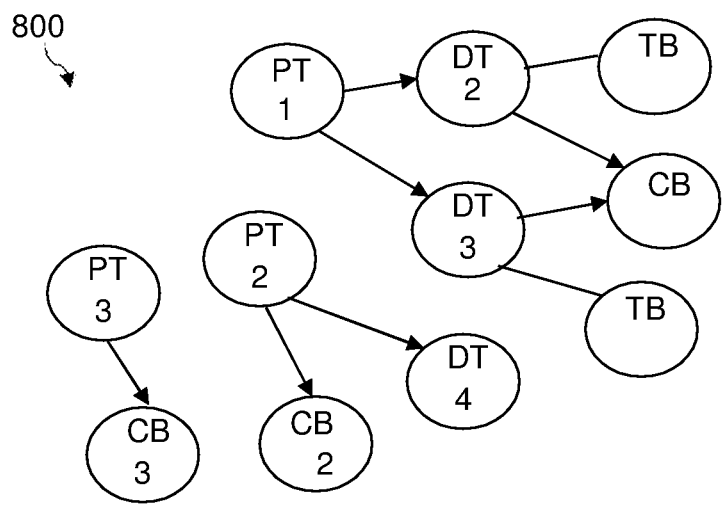
FIG. 9 is another functional schematic block diagram showing nodes with vectors for instructional purposes illustrating functional features of the present disclosure associated with the embodiments shown in the FIGS., for generating a work-flow diagram from technology specific literature.
Figure 10:
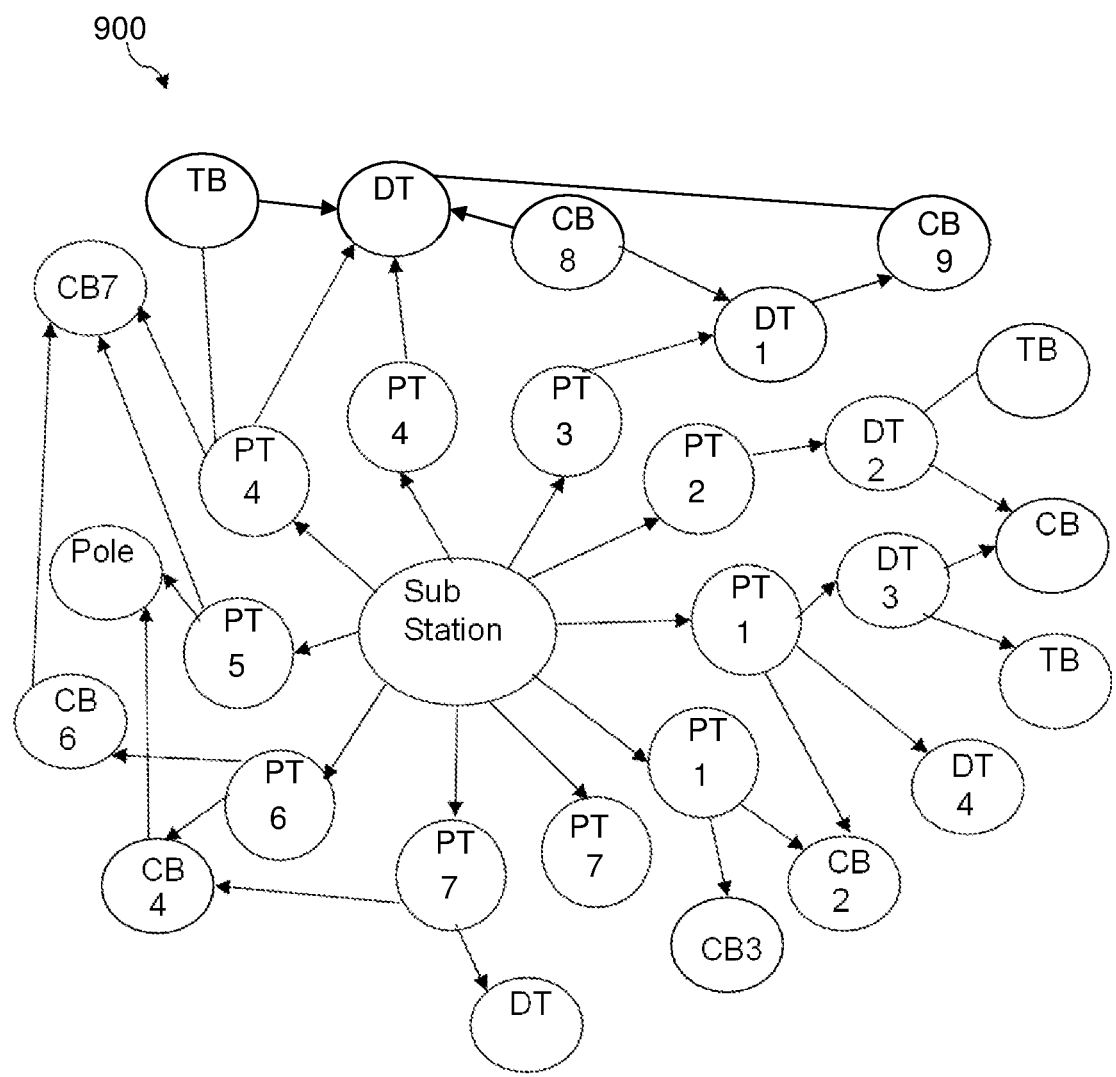
FIG. 10 is another functional schematic block diagram showing nodes with vectors which can include colors (not shown) for instructional purposes illustrating functional features of the present disclosure associated with the embodiments shown in the FIGS., for generating a work-flow diagram from technology specific literature.

The method includes using an industry entity domain model, for example, an E&U domain model to build a graph representing entities as nodes and their connection as vertices of actions being performed on these entities, as shown in FIGS. 8, 9 and 10.

The method includes a model mining text to identify directions of connections, as shown in FIG. 1, where applicable, and while doing so the model can refer to available text but also leverages an E&U domain model including possible symbol combinations and valid connections.

The method includes providing extensible framework for addition of subject matter expert (SME) rules. The method includes joining graphs built from different sections of text by iterative traversal of text to apply deduplication of nodes when same node is referred in different sections of text. The method includes the model applying a chromatic model to color the graphs with identified qualities and intensity of qualities. This enables color nodes as per qualities listed.

Embodiments according to the present disclosure can include a framework to automatically draw work-flow diagrams from energy and utility (E&U) industry specific literature. An E&U domain model includes possible symbol combinations and valid connections, and identifying the entities and their action involved. In one example, a method and system is based on preparing work-flow diagram based on component symbol and their action identified from literature, using an industry E&U model's component symbols and mapping actions identified from literature with a set of actions applicable on the components.

In one example according to the present disclosure, a method and system can include developing a work-flow diagram for the E&U industry by leveraging an industry model to extract E&U semantics. The industry model defines a structured relationship among the electrical components. Using the E&U industry model, the method and system can extract component symbols and their relationships. And, using the E&U industry model, the method and system can extract component definitions and their relationships, which enables drawing a work-flow diagram based on literature. Thus, the method and system can include establishing a relationship among components using a symbol database without which work-flow diagram cannot draw and/or validate the component extracted from literature. Thus, the method and system can include establishing a relationship among components using the symbol database and thereby a work-flow diagram can be initiated by the system can draw and/or validate the components.

Thereby, the method and system can include identifying a component that is closest to an entity of a technology area extracted from literature, for example, an E&U entity extracted from literature. The entities and actions performed by each entity, respectively, are used to build a graph which represents entities as nodes and their connection as an action. The method and system can use a graph-based domain model to solve for ambiguities. The component symbol database enables identifying a closest symbol which can be used while drawing a work-flow diagram from the technology area literature, for example, the E&U specific literature.

Thus, a method and a system in accordance with the present disclosure can generate a work-flow diagram by drawing a work-flow diagram which includes entities and actions performed by each entity at a respective step in an operation, thereby building a graph which represents entities as nodes and their connection as an action.

Thereby, the methods and systems of the present disclosure can include identifying connections using a technology area domain model, for example, an E&U domain model. And, drawing a work-flow diagram from a technology specific literature, for example, E&U specific literature, to extract the direction of connections between entities. Thereby, the method and system of the present disclosure includes identifying connections using a technology specific domain model, for example, an E&U domain model.

In one example in accordance with the present disclosure, the method and system can include identifying possible symbol combinations and valid connections, which can reference SME (Subject Matter Expert) rules to solve a situation where there is an ambiguity.

In another example according to the present disclosure, a system and method can include solving duplication of nodes by implementing a deduplication of nodes.

In another example according to the present disclosure, a system and method can include using a model to identify nodes and then identifying qualities and intensity of qualities by applying a chromatic model.

ADDITIONAL EMBODIMENTS AND EXAMPLES

The present disclosed includes a method and system which will convert a technology specific domain related work-order's textual instruction into graphical representation. For example, a method and system can include converting an energy & utility domain related work-order's textual instruction into graphical representation using electrical domain tokens mapped with E&U common information model (CIM). The method and system includes curating verb vocabulary for each organization's specific electrical domain token dictionary.

In general, an embodiment of the present disclosure can include curating associated electrical domain token dictionary associated with each function of specific organization, and linking of electrical domain terms to E&U industry standards for easy linkage to symbols for each entity. The process energy and utility specific literature and understand context of the literature can use electrical domain token capabilities. A work-flow diagram is created of a work-order's instruction using associated verbs for the specific function with a matching electrical domain token. The method and system can use a combination of deep learning and supervised learning algorithms to achieve the above-mentioned task of understanding context and creating work-flow diagrams.

Embodiments of the present disclosure can include leveraging industry models to extract E&U semantics for which has definition of each and every electrical component and the electrical components relationship with other components. The model is extend to establish the association of these components with component symbol database will be established so that these symbols can be used to represent the components. The components are identified by which are closest to E&U entity of an industry model. Any ambiguity can be solved by a graph based domain model. The graph based domain model can be used to resolve ambiguity by establishing domain rules and semantics for rapid learning and application of complex rules. The E&U Domain Model first builds the graph representing entities as nodes and their connection as vertices of actions being performed on these entities.

The method and system then mines text to identify a direction of connections where applicable, which can be represented by a vector in a diagram, and refers to available text and also leverages an E&U domain model including possible symbol combinations and valid connections. Additionally, the method and system can include addition of SME (Subject Matter Expert) rules.

The method and system join graphs built from different sections of text by iterative traversal of text to apply deduplication of nodes when same node is referred in different sections of text. A model then applies a chromatic model to color the graphs with identified qualities and intensity of qualities, that enables color nodes.

In another embodiment according to the present disclosure, a method and system can include building an E&U symbols dictionary, leveraging an industry model to extract E&U semantics for which has a definition of each and every electrical component and its relationship with other components. The model is extended to establish the association of these components with component symbol database so that these symbols can be used to represent the components.

The method and system include building a domain Graph Model by receiving a diverse set of entities specified in the description, such as transformers, circuit breakers, poles, etc. All the information is curated by mining content along with a semantic model, such that entities of interests are stored as nodes and the metadatalactions/context connects them, these connections are called as edges. This model provides unique ability to resolve ambiguity by establishing domain rules and enabling rapid learning on a semantic model. The model mines a description to identify a direction of connections where applicable, while doing so it not only refers to available text but also leverages an E&U domain model including a possible symbol combinations and valid connections. Additionally, the model also provides an extensible framework or system for addition of SME rules.

Further, the system and method can include a domain graph ranking and connectivity parity such that the graph rank is a maximum number of connections a single node can have in a simple graph which signifies maximum linkages content that can have in a given result. This parameter determines the quality and reliability of the findings, for example, resolving to a same entity which helps join graphs by iterative traversal of descriptions.

Further, the system and method applies chromatic polynomials to map a content category. The model then applies a chromatic model to color the domain graphs with identified qualities and intensity of qualities. This enables coloring of nodes as per qualities as well as intensity of the quality (for example, a different color for each quality and a darker color identifies greater intensity). These become the pivotal elements to further classification of the content. These content categories can be viewed as parameters that are attributed to every vertex in the graph. This can be achieved by mapping content category to various colors.

Further, validation with traversal logic can include using content category as colors, the content being partitioned into regions of different issues. With a final traversal, the neighboring region provides additional content to be reviewed using a semantic model. Relevant data can be mined by the system and can be sectioned into various entity states which are important for analysis by field force.

In one example, referring to FIG. 1, a system 10, according to the present disclosure, can be configured to extract semantics, for example E&U semantics, from an industry standard 26, for example, an agreed upon industry standard for an industry or a technical area, which has a definition of each and every component, for example, electrical components, and relationships with other components. A mapping with icons 28 can be used to associate these components as defined in the industry standard 26 with a component symbol database 47 so that the symbols can be used to represent the components.

Referring to FIG. 15, Table 1 3000, depicts an example of component symbols. A component category 3002 column includes a power supply, and a second column 3004 includes a component name. Columns with component descriptions, types, associated icons and images are also shown.

Figure 3:
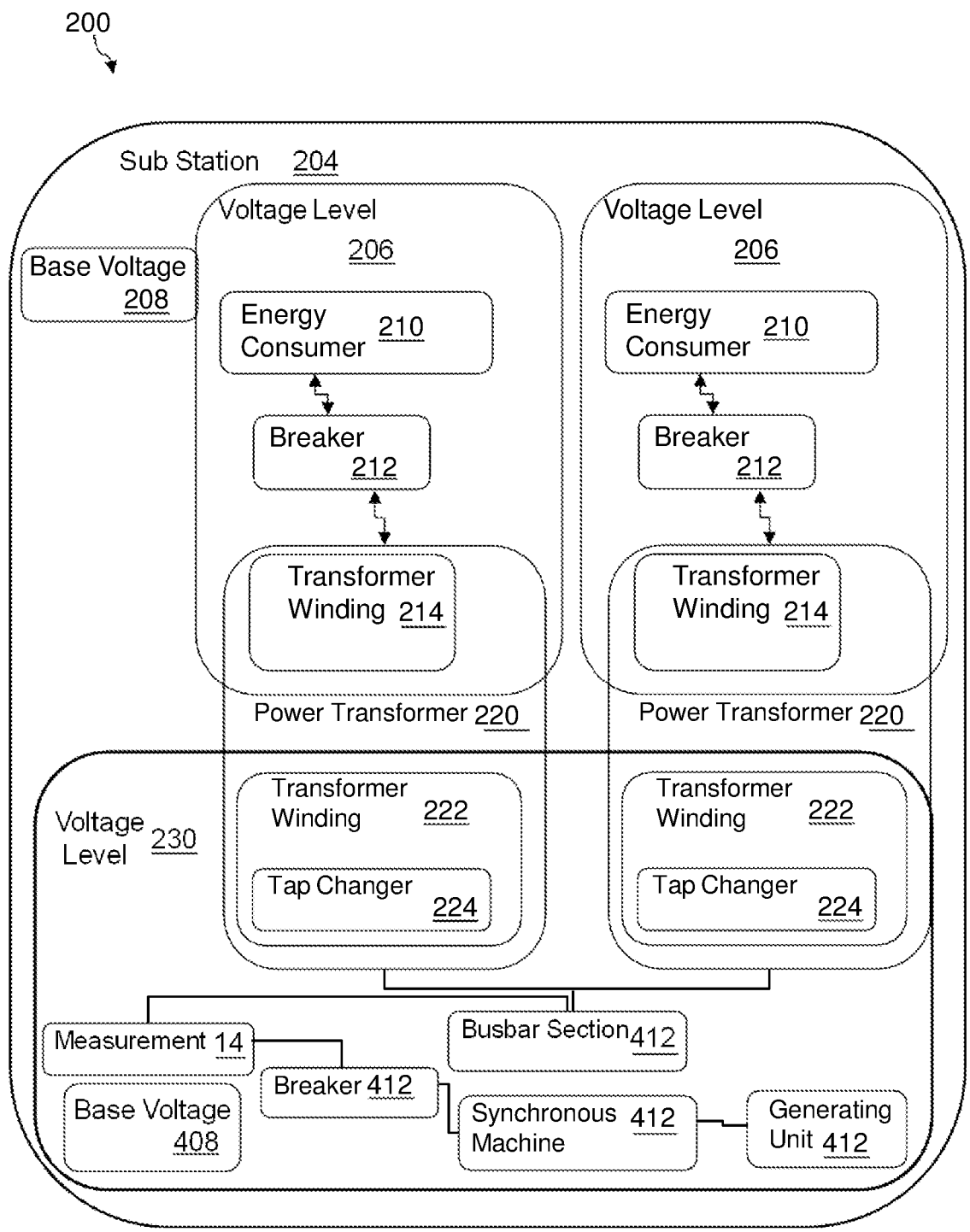
FIG. 3 is a functional schematic block diagram showing a sub-station with components, for instructional purposes illustrating functional features of the present disclosure associated with the embodiments shown in the FIGS., for generating a work-flow diagram from technology specific literature.

In one example, an industry standard 26 (see FIG. 1) can be incorporated in a common information model 200 (CIM), as shown in FIG. 1 and shown in detail in FIG. 3. Referring to FIG. 3, in one example according to the present disclosure, a common information model 200 includes an electrical substation 204 as part of an electrical utility, includes a voltage level 206 having a base voltage 208, and the voltage level including an energy consumer 210, for example, an end user, and a breaker 212.

Referring to FIG. 4, an exemplary method and system for preparing a data set of component and components actions includes using the common information model 200, to create a mapping with icons 28 to populate a component symbol database or corpus 47. Knowledge repositories (for example, including manuals 308, audio recordings 304, and video recordings 306), can be extracted or received for a first conversion 310 including an audio to text conversion 312 and a video to image conversion 314. A second conversion 320 includes converting into sentences with verbs and nouns 316 the extracted text, and associating the text to corresponding images 318. The output of the sub-process second conversion 320 includes content and associated images at source level for an organization 320. The method and system includes extracting features and functions from the sources as in block 324. A resulting output includes content and associated images 330.

Figure 5:
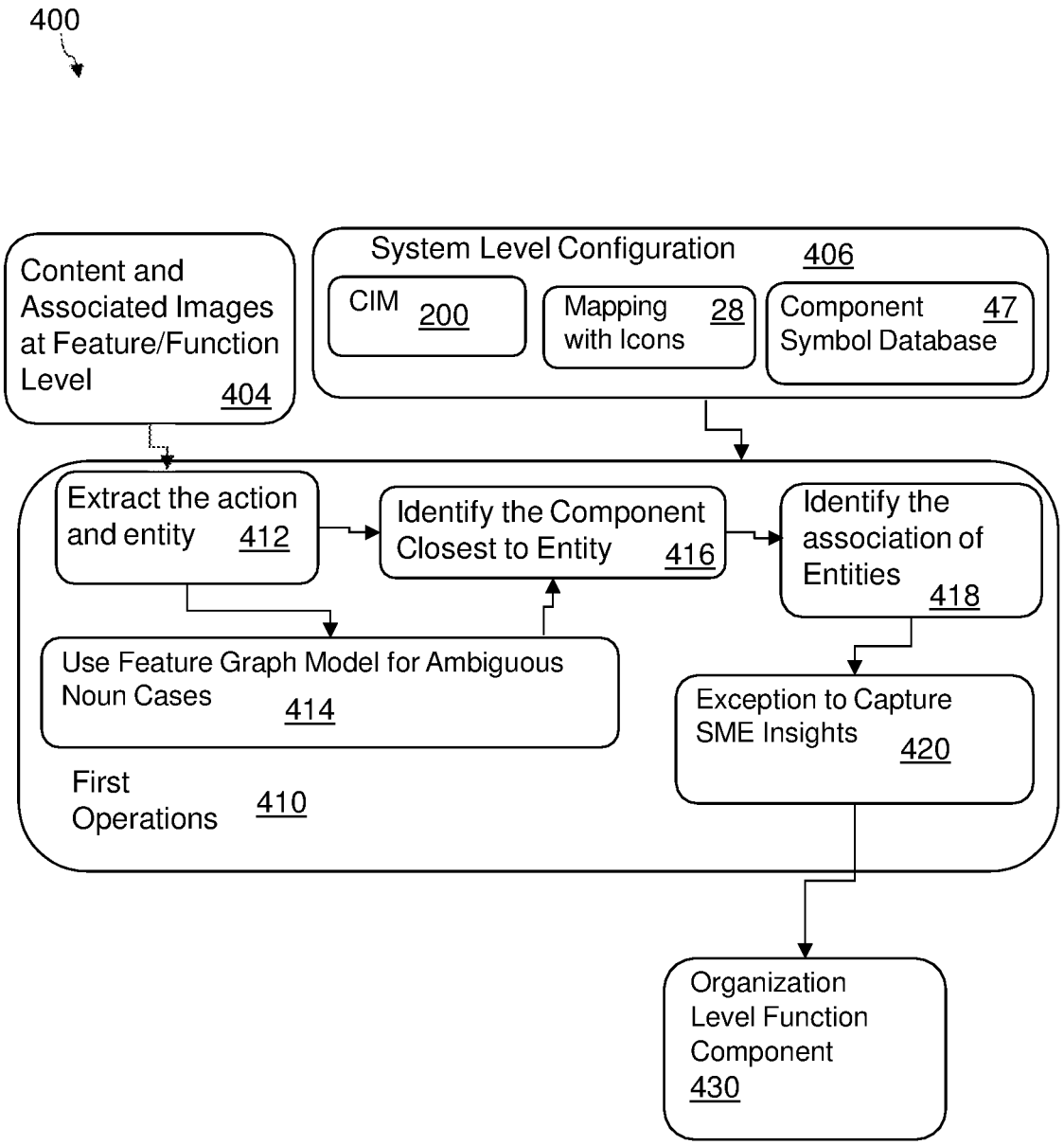
FIG. 5 is another functional schematic block diagram showing a series of operations and functional methodologies, for instructional purposes illustrating functional features of the present disclosure associated with the embodiments shown in the FIGS., for generating a work-flow diagram from technology specific literature.

Referring to FIG. 5, continuing with the method and system shown in FIG. 4, each organization will have different actions associated with components, respectively, for different operational functions, as illustrated in a system 400. The system 400 will curate an electrical component's action, being performed at a feature/function level 404 for each organization. A system level configuration 406 include CIM 200, Mapping with Icons 28 and component symbol database 47. The content and associated images and the system level configuration are fed into or considered input into a set of first operations 410. The system identifies the action and entities from each line of a source to extract the action and entity 412. The system will identify the components which are closest to the entity 416 of industry model. Any ambiguity will be solved by a graph based domain model 414. Once entities are identified for function/feature, as in block 414, the system associates the entities with other entities 418 using industry model relationship of components by identifying the components closest to the entity 416. Any noise in the output can be resolved by an SME loop using SME insights or input to resolve ambiguity 420, as an exception. The first operations 410 are outputted to organization level function component 430.

Referring to Table 2 below, an example of extracted components and their associated actions for functions is shown. The table shows a first column of descriptions, a second column of components and a third column of actions.

TABLE 2

| | | | |
|---|---|---|---|
| 1) | Power Plant generates electricity connects to step up transformer. | 1. Power Plant<br>2. Step-Up Transformer | Action =Connects |
| 2) | The Transformer steps up voltage for transmisson towards transmisson tower | 1. Transformer<br>2. Transmission Tower | Action =Step-up |

TABLE 2-continued

| | | | |
|---|---|---|---|
| 3) | It further trasmits power to transmission | 1. Trasnsmission Tower<br>2. Transmission Substation | Adtion =Transmits |
| 4) | Transmission substation connects to distrubtion substation for further distribution substastion | 1. Transmission Substation<br>2. Dlstrbutton | Action =Connects Substattor |
| 5) | Distribution substations distibutes electricity to houses through Pole mouted transformers. | 1. Distribution Substation<br>2. Pole Mounted Transformer<br>3. House | Action =distribute |

Figure 6:
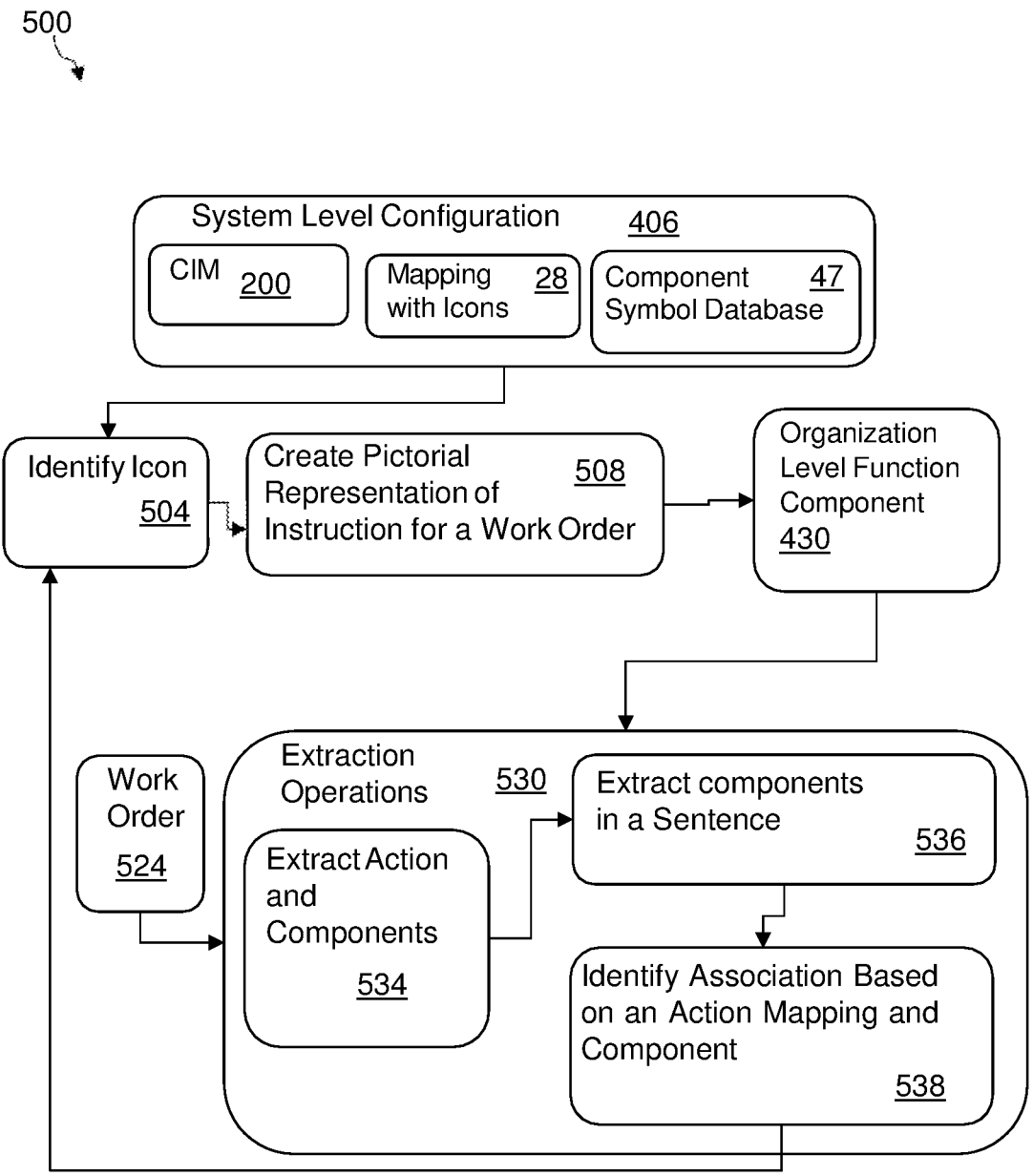
FIG. 6 is another functional schematic block diagram showing a series of operations and functional methodologies in response to receiving a work order, for instructional purposes illustrating functional features of the present disclosure associated with the embodiments shown in the FIGS., for generating a work-flow diagram from technology specific literature.

Referring to FIG. 6, continuing with the method and system shown in FIGS. 4 and 5, which includes the system level configuration 406 described in FIG. 5. The system 500 identifies icons and association for instruction 504, for example, an E&U icon. The system includes identifying icons 504. The system further includes converting work-order instructions 524 into pictorial representations of instructions for the work order as in block 508. Organization level function components 430, as introduced in FIG. 5, enable action meta data for use when extracting components in a sentence as in block 536, as part of extraction operations 530. The system can extract each line of the work-order and extract actions and components, as in block 534, for example electrical components, from each line to identify entities and actions of a sentence, as in block 536. The system can associate the entities with components and actions identified for the same feature/function as in bloc 538, which the system curated during previous operations.

Figure 7:
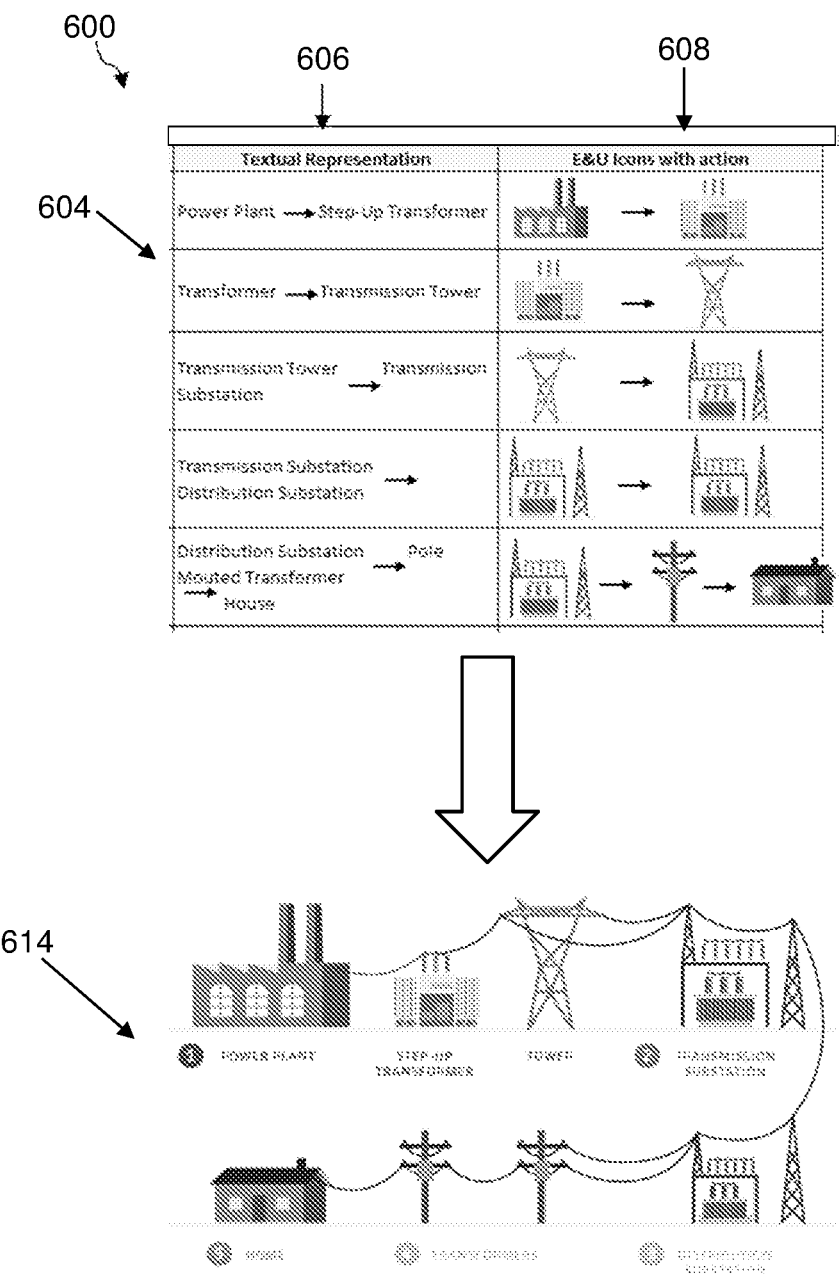
FIG. 7 is another functional schematic block diagram showing a chart with associated symbols and a pictorial diagram for instructional purposes illustrating functional features of the present disclosure associated with the embodiments shown in the FIGS., for generating a work-flow diagram from technology specific literature.

Referring to FIG. 7, a system 600 according to embodiments of the present disclosure, includes extracting textual description 606 and representing items and entities in the descriptions as icons with an action 608, as in a chart 604. The system 600 can use the chart 604 to generate a pictorial diagram 614.

MORE EXAMPLES AND EMBODIMENTS

In examples, referring to FIGS. 8, 9 and 10, a model can build a graph representing entities as nodes and their connection as vertices.

The graph can include: a circuit breaker (CB), a power transformer (PT), a distribution transformer (DT), poles in a distribution network (PO), a transformer busing (TB), and an overhead line (OHL).

The model and graph can include the following, as Equation 701:

$$G=(N,E,\varphi) \text{ where}$$

N is a finite set, called the vertices of G,

E is a finite set, called the edges of G, and $\varphi$ is a function with domain E and codomain P2(V).

A vertex-edge incidence matrix is a matrix of order n×e and denoted by $A(G)=[a_{ij}]$, whose n rows correspond to the n vertices and the e columns correspond to the e edges as follows, as Equation 702:

$$a_{ij} = \begin{cases} 1 & \text{if the } j^{th} \text{ edge of } e_i \text{ is incident on } i^{th} \text{ vertex of } v_i \\ 0 & \text{otherwise} \end{cases}$$

Thus, A(G) with m vertices and n edges can be represented as follows, as Equation 703:

$$(G) = \begin{bmatrix} a_{11}a_{12}a_{13} & \dots & a_{1n} \\ a_{21}a_{22}a_{23} & \dots & a_{2n} \\ & \dots & \\ & \dots & \\ a_{m1}a_{m2}a_{m3} & \dots & a_{mn} \end{bmatrix}$$

Referring to FIG. 8, a graph 700 illustrates nodes and interconnects as shown. The graph 700 includes nodes, PT 1, DT 2, TB, DT 3, CB, PT 2, PT 3, C B3, CB 2, and DT 4.

Referring to FIG. 9, a graph 800 illustrates the nodes and vector interconnection as shown. The graph 800 includes the nodes as above, however, some of the interconnections of the nodes is shown with vectors. Referring to FIG. 9, a graph rank and connectivity parity can be implemented. The graph rank is the maximum number of connections a single node can have signifying maximum linkages content can have, determining the quality. A framework or system mines the data available and rates it to identify how optimal is the interpretation. The rank of an undirected graph is defined as the number n-c, where n is the number of vertices and c is the number of connected components of the graph. From Equation 703, minimum rank as (m−1) can be computed. A node with high traversal can become a significant spot in a graph, which can be represented by creating an adjacency matrix such that, a graph G with n vertices and no parallel edges is an n×n matrix J=[Jij] whose elements are given by, Equation 704 below:

$$a_{i,j} = \begin{cases} 1 & \text{if there is an edge between the } i^{th} \text{ and } j^{th} \text{ vertices} \\ 0 & \text{if there is no edge between them} \end{cases}$$

For J, an (i, j) gives the number of paths of the length n from vi to vj (i.e., number of different edge priorities of n edges) whenever i≠j.

Suppose vi and vj to be two nodes of graph 700 and graph 800 to be the adjacency matrix. If the system defines the matrix Bn as J+J2+J3+ . . . +Jn, then, from the matrix Bn, the system can determine the number of paths of length n or less from vi to vj (for i≠j). Connectivity parity B can be defined, as, Equation 705 below:

$$B=J+J2+J3+ \dots +Jm-1$$

G is a connected graph if and only if for every pair of distinct indices i and j, the system has $b_{ij} \neq 0$ i.e., B has no zero entries. From Equation 704 and Equation 705, the Quality index Q can be as follows, in Equation 706 as below:

$$Q = \frac{\text{Rank of } A(G)}{\text{Connectivity parity}} = \frac{m-1}{B}$$

In another example, referring to FIG. 10, chromatic polynomials to map content category can include content categories that are pertinent with the entity context (qualities) and can be viewed as parameters that are attributed to every vertex in a graph. The maximum number of the content category can be identified that can be used in the ploughed content which does not bring uncontrollable variation in the data. This can be achieved by mapping content category to various colors to the graph 900 (such that no two adjacent vertices have the same color 'C'), as in Equation 707 below:

$$C = \{C1, C2, C3, \ldots Cn\}$$

Any function f: V→C is called a coloring of the graph 900 shown in FIG. 10 using n colors, representing the number of content category. The smallest number of colors to produce a proper coloring of a graph 900 is called the chromatic number of the graph 900 denoted by $\chi(G)$. Number of colors is dependent on the qualities of domain entities available in description. Thus, a graph as shown in FIG. 10, that requires 'k' different colors, as in Equation 708 below:

$$\chi(G) = k$$

$\delta(G)$ is the minimum degree of any vertex. The degree of the graph represents how much is the given mined content linked to other mined contents, higher degree of graph means content is relevant. The chromatic number is given by, Equation 709 below:

$$\chi(G) \geq \frac{m}{(m - \delta(G))}$$

Similarly, if $\Delta(G)$ is the largest degree of any vertex of G, then maximum colors that can be applied to the G is, Equation 710 below:

$$\chi(G) \leq 1 + \Delta(G)$$

Equation 711 gives the maximum number of content category that can be used in a current dataset. From Equation 709 and Equation 710, a range of the content category can be applied to the graph G, as in Equation 711 below:

$$\frac{m}{(m - \delta(G))} \geq \chi(G) \leq 1 + \Delta(G)$$

G can be sacrosanct and derive the maximum number of content category from Equation 712, so the framework or system can restrict the represented current state from being diluted with high number of categories.

Referring to FIG. 10, a graph 900 includes illustrated nodes, vector interconnections, and can include colors (not shown) and/or a color methodology. Such colors can represent identified qualities and intensity of qualities. For example, such colors can include different colors to represent: a normal state, operation issues, rusted body, unsafe construction in proximity, and threat of tree/object falling nearby. The graph 900 includes nodes labeled: TB, DT, CB8, DT1, CB9, PT1, PT2, PT3, PT4, PT5, PT6, PT7, DT1, DT2, TB, DT3, CB, DT4, CB2, CB3, CD4, CB6, CB7, Pole, and a sub-station. The graph 900 further includes connection lines and vectors.

Referring to FIG. 10, a coloring methodology of graphs includes coloring of a graph which induces a partitioning of the vertices into different subsets. No two vertices in any of these subsets are adjacent, such a subset of vertices is called an independent set denoted by $\beta(G)$. Thus, coloring can be used as the taxonomy parallel for classification of the content.

For graph 900 (FIG. 10) the largest number of vertices can have the same color and cannot exceed $\beta(G)$, so, Equation 712 below:

$$k \cdot \beta(G) \geq n \Rightarrow \beta(G) \geq \frac{n}{k}$$

Equation 713, gives maximum number of vertices in the largest independent set for a content category. The system can now find out what is the prevalent content category in the mined documents. Minimum edge covering $EC_{min}$ is a set 'g' of edges if every vertex in G is incident on at least one edge in g and if no proper subset of g is an edge covering of G, in Equation 713 below:

$$EC_{min} = \frac{n+1}{2}$$

Minimum vertex covering $VC_{min}$ is a set of vertices such that each edge of the graph is incident to at least one vertex of the set n. This can be solved by vertex cover algorithm, Framework by now has 'n' number of mined contents in its library being represented in the graph 900, as in Equation 714 below:

$$VC_{min} = n - \left(\frac{n}{\Delta(n) + 1}\right)$$

The graph 900 can take this as the pivotal mined content and collect other related independent sets for the sub-componentization or further classification. It's important to note that the maximum reach of its research is given by the ECmin computation.

Embodiments of the present disclosure provide a method and system for generating a work-flow diagram from technology specific literature which can streamline a help-desk procedure for assisting a customer. Also, techniques consistent with the present disclosure can reduce time needed to assess technical or data driven problems and assist in generating a solution to such problems by efficiently converting text and video input into pictorial diagrams for assessing such problems.

FURTHER EMBODIMENTS AND EXAMPLES

Account data, for instance, including profile data related to a user, and any data, personal or otherwise, can be collected and stored, for example, in the control system 70. It is understood that such data collection is done with the knowledge and consent of a user, and stored to preserve privacy, which is discussed in more detail below. Such data can include personal data, and data regarding personal items.

In one example a user can register 82 have an account 81 with a user profile 83 on a control system 70, which is discussed in more detail below. For example, data can be collected using techniques as discussed above, for example, using cameras, and data can be uploaded to a user profile by the user.

MORE EXAMPLES AND EMBODIMENTS

In the embodiment of the present disclosure shown in FIGS. 1 and 2, a computer can be part of a remote computer or a remote server, for example, remote server 1100 (FIG. 6). In another example, the computer 72 can be part of a control system 70 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the mobile device can include a computer 30 having a processor 32 and a storage medium 34 which stores an application 40. The application can incorporate program instructions for executing the features of the present disclosure using the processor 32. In another example, the mobile device application or computer software can have program instructions executable for a front end of a software application incorporating the features of the method of the present disclosure in program instructions, while a back end program or programs 74, of the software application, stored on the computer 72 of the control system 70 communicates with the mobile device computer and executes other features of the method. The control system 70 and the mobile device or computer 30 can communicate using a communications network 60, for example, the Internet.

Thereby, the method 100 according to an embodiment of the present disclosure, can be incorporated in one or more computer programs or an application 40 stored on an electronic storage medium 34, and executable by the processor 32, as part of the computer on the mobile device. For example, a mobile device can communicate with the control system 70, and in another example, a device such as a video feed device can communicate directly with the control system 70. Other users (not shown) may have similar mobile devices which communicate with the control system similarly. The application can be stored, all or in part, on a computer or a computer in a mobile device and at a control system communicating with the mobile device, for example, using the communications network 60, such as the Internet. It is envisioned that the application can access all or part of program instructions to implement the method of the present disclosure. The program or application can communicate with a remote computer system via a communications network 60 (e.g., the Internet) and access data, and cooperate with program(s) stored on the remote computer system.

Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 70 is in communication with the computer 30, and the computer can include the application or software 40. The computer 30, or a computer in a mobile device (not shown) communicates with the control system 70 using the communications network 60.

In another example, the control system 70 can have a front-end computer belonging to one or more users, and a back-end computer embodied as the control system.

Also, referring to FIG. 1, a device can include a computer 30, computer readable storage medium 34, and operating systems, and/or programs, and/or a software application 40, which can include program instructions executable using a processor 32. These features are shown herein in FIG. 1, and also in an embodiment of a computer system shown in FIG. 6 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 70, a device(s) 30, or in one example the devices which can belong to one or more users, can be in communication with the control system 70 via the communications network 60. In the embodiment of the control system shown in FIG. 1, the control system 70 includes a computer 72 having a database 76 and one or more programs 74 stored on a computer readable storage medium 73. In the embodiment of the disclosure shown in FIG. 1, the device 30 communicate with the control system 70 and the one or more programs 74 stored on a computer readable storage medium 73. The control system includes the computer 72 having a processor 75, which also has access to the database 76.

The control system 70 can include a storage medium 80 for maintaining a registration 82 of users and their devices for analysis of the audio input. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, a computer on location 30, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device and computer 30 having the application 40. The application 40 is stored on the computer 30 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a computer 30 or device. It is envisioned that the control system 70 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

STILL FURTHER EMBODIMENTS AND EXAMPLES

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks another FIG. A method shown in one FIG. may be another example embodiment which can include aspects/operations shown in another FIG. and discussed previously.

ADDITIONAL EMBODIMENTS AND EXAMPLES

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

OTHER ADDITIONAL EMBODIMENTS AND EXAMPLES

In one example, Artificial Intelligence (AI) can be used, all or in part, for a learning model for analyzing data associated with items and assets.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

FURTHER DISCUSSION REGARDING EXAMPLES AND EMBODIMENTS

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FURTHER ADDITIONAL EXAMPLES AND EMBODIMENTS

Referring to FIG. 5, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

STILL FURTHER ADDITIONAL EXAMPLES AND EMBODIMENTS

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

OTHER ASPECTS AND EXAMPLES

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

ADDITIONAL ASPECTS AND EXAMPLES

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
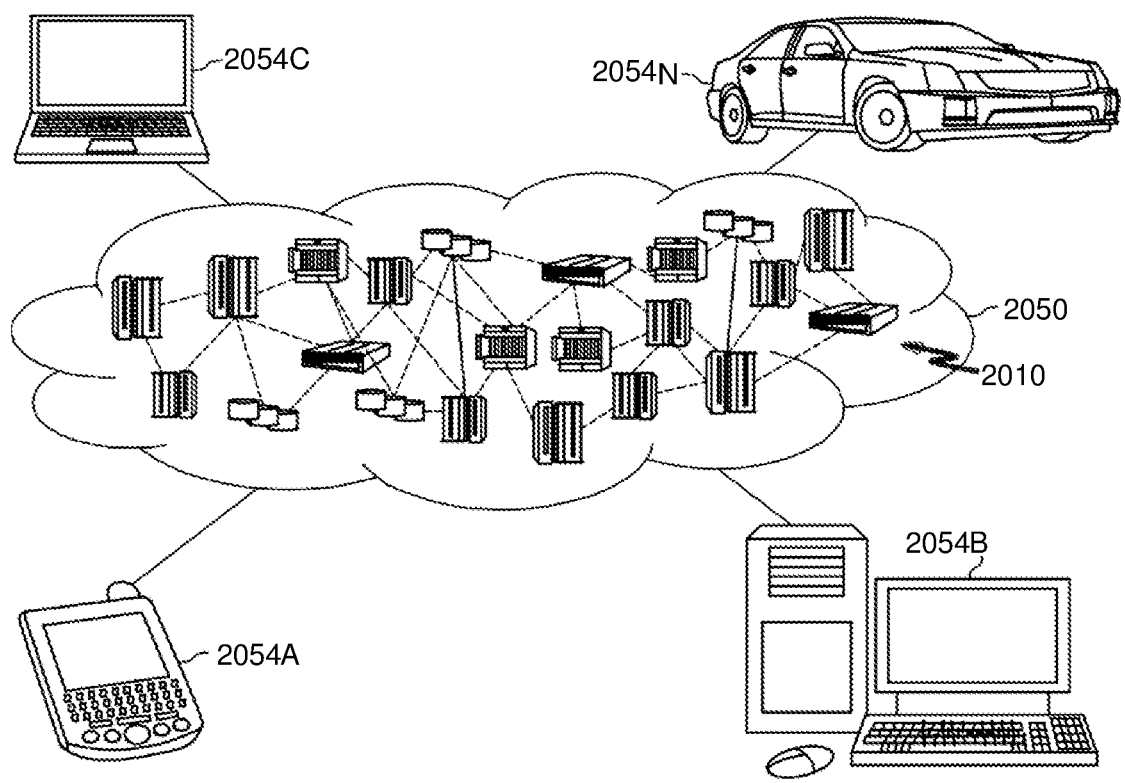
FIG. 13 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 13 are intended to be illustrative only and that computing nodes 2010 and cloud computing environment 2050 can communicate with any type of computerized device over any type of network and/or network addressable connection (e.g., using a web browser).

Figure 14:
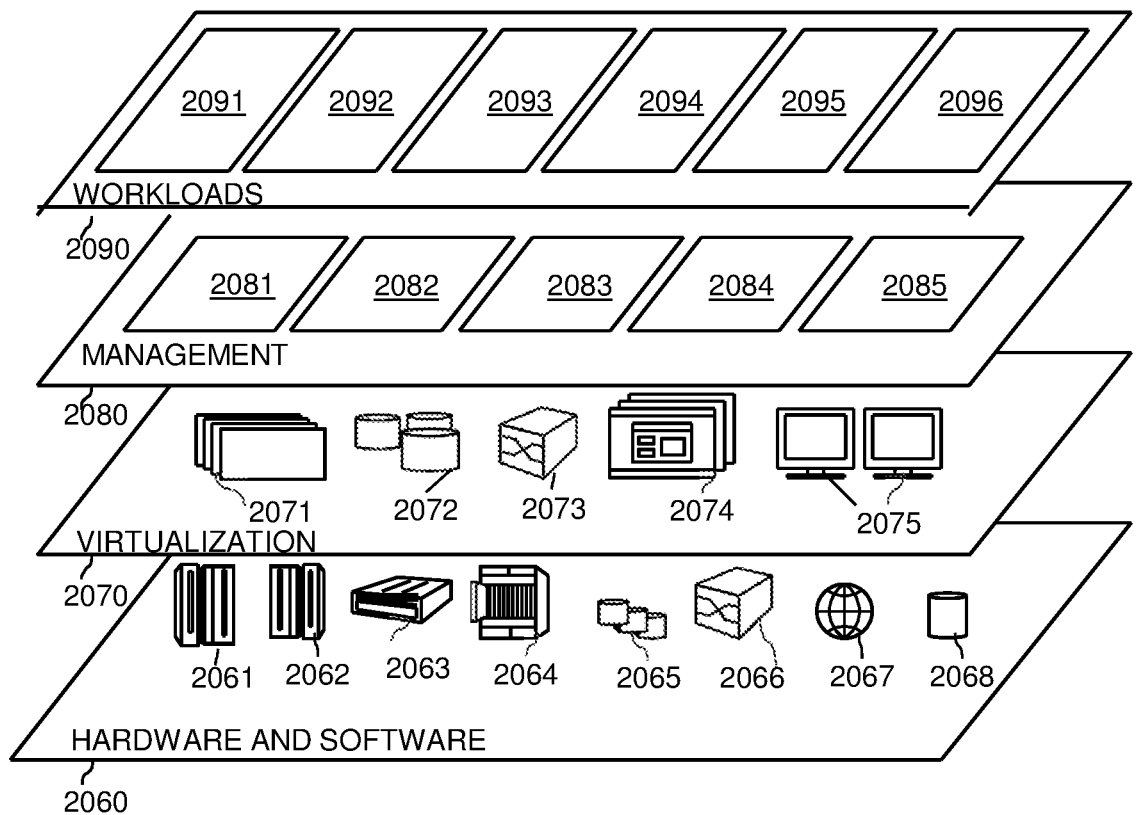
FIG. 14 is a block diagram depicting abstraction model layers according to an embodiment of the present invention.

Referring now to FIG. 14, a set of functional abstraction layers provided by cloud computing environment 2050 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and generating a work-flow diagram 2096, for example, generating a work-flow diagram from technology specific literature using natural language processing.

What is claimed is:

1. A computer-implemented method for generating a work-flow diagram from technology specific literature, comprising:
   determining, using a computer, using an analysis of technology specific literature which includes using natural language processing (NLP), semantics for a plurality of components defined in the technology specific literature;
   associating, using the computer, the plurality of components to symbols in a component symbol database;
   assigning the associated symbols to each of the plurality of components, respectively;
   determining a relationship for each of the plurality of components;
   assigning nodes, and assigning vectors when applicable, for each of the symbols; and
   generating a work-flow diagram for the technology specific literature using the assigned associated symbols for each of the plurality of components and the nodes and the vectors for each of the symbols.

2. The method of claim 1, wherein the technology specific literature is received at the computer.

3. The method of claim 1, wherein the technology specific literature is, at least in part, energy and utility industry specific literature.

4. Method of claim 1, further comprising:
   identifying each of the plurality of components which are related to an industry model for a technology.

5. The method of claim 1, further comprising:
   identifying each of the plurality of components which are related to entities, respectively, of an industry model for a technology; and
   resolving ambiguity regarding relatedness of one of the plurality of components to an entity of the industry model by using a graph-based domain model.

6. The method of claim 1, further comprising:
   identifying each of the plurality of components which are related to entities, respectively, of an industry model for a technology;
   resolving ambiguity regarding relatedness of one of the plurality of components to an entity of the industry model by using a graph-based domain model; and
   the graph-based model includes representing the entities as nodes and connections of the nodes to each other as vertices of actions being performed on the entities.

7. The method of claim 6, further comprising:
identifying directions of connections by mining text of the technology specific literature.

8. The method of claim 6, wherein the graph-based model also analyzes a domain model for an industry of the technology specific literature, the domain model including possible symbol combinations and valid connections.

9. The method of claim 1, wherein the assigning of the associated symbols includes using subject matter expert (SME) rules.

10. The method of claim 1, further comprising:
joining graphs generated from different sections of text of the technology specific literature, as part of the generating of the work-flow diagram, the joining of the graphs including iterative traversal of text to apply deduplication of nodes when a same node is referred to in different sections of the text.

11. The method of claim 1, further comprising:
chromatic modeling to color graphs with identified qualities and intensity of qualities, as part of the generating of the work-flow diagram.

12. The method of claim 1, further comprising:
receiving, at the computer, the technology specific literature; and
analyzing the technology specific literature using the natural language processing.

13. A system using a computer for generating a work-flow diagram from technology specific literature, which comprises:
a computer system comprising; a computer processor, a computer-readable storage medium, and program instructions stored on the computer-readable storage medium being executable by the processor, to cause the computer system to perform the following functions to:
determine, using a computer, using an analysis of technology specific literature which includes using natural language processing (NLP), semantics for a plurality of components defined in the technology specific literature;
associate, using the computer, the plurality of components to symbols in a component symbol database;
assign the associated symbols to each of the plurality of components, respectively;
determine a relationship for each of the plurality of components;
assign nodes, and assigning vectors when applicable, for each of the symbols; and
generate a work-flow diagram for the technology specific literature using the assigned associated symbols for each of the plurality of components and the nodes and the vectors for each of the symbols.

14. He system of claim 13, wherein the technology specific literature is received at the computer.

15. The system of claim 13, wherein the technology specific literature is, at least in part, energy and utility industry specific literature.

16. The system of claim 13, further comprising:
identifying each of the plurality of components which are related to an industry model for a technology.

17. The system of claim 13, further comprising:
identifying each of the plurality of components which are related to entities, respectively, of an industry model for a technology; and
resolving ambiguity regarding relatedness of one of the plurality of components to an entity of the industry model by using a graph-based domain model.

18. The system of claim 13, further comprising:
identifying each of the plurality of components which are related to entities, respectively, of an industry model for a technology;
resolving ambiguity regarding relatedness of one of the plurality of components to an entity of the industry model by using a graph-based domain model; and
the graph-based model includes representing the entities as nodes and connections of the nodes to each other as vertices of actions being performed on the entities.

19. The system of claim 18, further comprising:
identifying directions of connections by mining text of the technology specific literature.

20. A computer program product for generating a work-flow diagram from technology specific literature, the computer program product comprising a computer readable storage medium having program instructions embodied therewith, the program instructions executable by a computer to cause the computer to perform functions, by the computer, comprising the functions to:
determine, using a computer, using an analysis of technology specific literature which includes using natural language processing (NLP), semantics for a plurality of components defined in the technology specific literature;
associate, using the computer, the plurality of components to symbols in a component symbol database;
assign the associated symbols to each of the plurality of components, respectively;
determine a relationship for each of the plurality of components;
assign nodes, and assigning vectors when applicable, for each of the symbols; and
generate a work-flow diagram for the technology specific literature using the assigned associated symbols for each of the plurality of components and the nodes and the vectors for each of the symbols.

* * * * *